US012609722B2

(12) United States Patent
Kermalli et al.

(10) Patent No.: US 12,609,722 B2
(45) Date of Patent: Apr. 21, 2026

(54) APPARATUS FOR IMPROVING TRANSMITTER-RECEIVER ISOLATION

(71) Applicant: Huawei Technologies Co., Ltd., Shenzhen (CN)

(72) Inventors: Munawar Kermalli, Morris Plains, NJ (US); Ahmed Hassan Abdelaziz Abdelrahman, Hillsborough, NJ (US); Zhengxiang Ma, Summit, NJ (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 840 days.

(21) Appl. No.: 17/810,493

(22) Filed: Jul. 1, 2022

(65) Prior Publication Data

US 2022/0337275 A1 Oct. 20, 2022

Related U.S. Application Data

(63) Continuation of application No. PCT/US2020/012053, filed on Jan. 2, 2020.

(51) Int. Cl.
| | |
|---|---|
| *H04B 1/12* | (2006.01) |
| *H01Q 3/26* | (2006.01) |
| *H04B 1/04* | (2006.01) |
| *H04B 1/14* | (2006.01) |

(52) U.S. Cl.
CPC ......... *H04B 1/0475* (2013.01); *H01Q 3/2641* (2013.01); *H04B 1/12* (2013.01); *H04B 1/14* (2013.01)

(58) Field of Classification Search
CPC .......... H04B 1/0475; H04B 1/12; H04B 1/14; H01Q 3/2641
See application file for complete search history.

(56) References Cited

U.S. PATENT DOCUMENTS

| | | | |
|---|---|---|---|
| 5,264,862 A | 11/1993 | Kumpfbeck | |
| 8,422,540 B1 | 4/2013 | Negus et al. | |
| 2007/0200766 A1* | 8/2007 | McKinzie | H01Q 9/0421 |
| | | | 343/745 |
| 2017/0179593 A1* | 6/2017 | Doane | G01S 7/2813 |
| 2020/0381844 A1* | 12/2020 | Kim | H01Q 21/26 |

* cited by examiner

*Primary Examiner* — Henry Luong
(74) *Attorney, Agent, or Firm* — Slater Matsil, LLP

(57) ABSTRACT

An antenna of a communication device includes a first antenna element operatively coupled to a transmitter of the communication device, the first antenna element configured to radiate a first signal generated by the transmitter; a second antenna element operatively coupled to a receiver of the communication device, the second antenna element configured to receive signals; and at least one third antenna element operatively coupled to at least one first reactive load, the at least one third antenna element configured to radiate a second signal modified in accordance with the at least one first reactive load, the second signal being induced at the at least one third antenna element by the first signal, and the at least one first reactive load being configured to modify the second signal to destructively cancel with a third signal induced at the second antenna element by the first signal.

22 Claims, 11 Drawing Sheets

28mm DIPOLE
900

RX VIRTUAL CELL

TX VIRTUAL CELL

905

APPARATUS FOR IMPROVING TRANSMITTER-RECEIVER ISOLATION

CROSS-REFERENCE TO RELATED APPLICATIONS

This application is a continuation of International Application No. PCT/US2020/012053 filed on Jan. 2, 2020 and entitled "Apparatus for Improving Transmitter-Receiver Isolation," the disclosure of which is hereby incorporated herein by reference in its entirety.

TECHNICAL FIELD

The present disclosure relates generally to antennas, and in particular embodiments, to apparatus for improving transmitter-receiver isolation.

BACKGROUND

Frequency division duplexed (FDD) communication systems require isolation between the transmitter (TX) and the receiver (RX) to help keep the TX noise from saturating the RX and degrading RX sensitivity. A commonly used technique to help increase TX-RX isolation is to spatially separate the TX and the RX by using separate antennas.

However, spatially separating the TX and RX antennas is counter to the drive to reduce the physical size of the communicating devices, which includes minimizing the size of the antennas of the communicating devices. Therefore, there is a need for apparatus for improving TX-RX isolation without simply increasing the antenna separation.

SUMMARY

According to a first aspect, an antenna of a communication device is provided. The antenna comprising: a first antenna element operatively coupled to a transmitter of the communication device, the first antenna element configured to radiate a first signal generated by the transmitter; a second antenna element operatively coupled to a receiver of the communication device, the second antenna element configured to receive signals; and at least one third antenna element operatively coupled to at least one first reactive load, the at least one third antenna element configured to radiate a second signal modified in accordance with the at least one first reactive load, the second signal being induced at the at least one third antenna element by the first signal, and the at least one first reactive load being configured to modify the second signal to destructively cancel with a third signal induced at the second antenna element by the first signal.

In a first implementation form of the antenna according to the first aspect as such, further comprising at least one fourth antenna element operatively coupled to at least one second reactive load, the at least one fourth antenna element configured to radiate a fourth signal modified in accordance with the at least one second reactive load, the fourth signal being induced at the at least one fourth antenna element by the first signal, and the at least one second reactive load being configured to modify the fourth signal to destructively cancel with the third signal induced at the second antenna element by the first signal.

In a second implementation form of the antenna according to the first aspect as such or any preceding implementation form of the first aspect, the at least one first reactive load comprising at least one of an inductive load, a capacitive load, or a network of inductive and capacitive loads.

In a third implementation form of the antenna according to the first aspect as such or any preceding implementation form of the first aspect, the at least one second reactive load comprising at least one of an inductive load, a capacitive load, or a network of inductive and capacitive loads.

In a fourth implementation form of the antenna according to the first aspect as such or any preceding implementation form of the first aspect, the at least one third antenna element comprising three third antenna elements, the at least one first reactive load comprising three first reactive loads, each of the three third antenna elements being operatively coupled to one of the three first reactive loads, and the first antenna element and the three third antenna elements forming a transmitter cell.

In a fifth implementation form of the antenna according to the first aspect as such or any preceding implementation form of the first aspect, the three first reactive loads having different reactances.

In a sixth implementation form of the antenna according to the first aspect as such or any preceding implementation form of the first aspect, the at least one fourth antenna element comprising three fourth antenna elements, the at least one second reactive load comprising three second reactive loads, each of the three fourth antenna elements being operatively coupled to one of the three second reactive loads, and the second antenna element and the three fourth antenna elements forming a receiver cell.

In a seventh implementation form of the antenna according to the first aspect as such or any preceding implementation form of the first aspect, the three second reactive loads having different reactances.

In an eighth implementation form of the antenna according to the first aspect as such or any preceding implementation form of the first aspect, the second antenna element being located at a null of a radio frequency (RF) current produced by the first antenna element.

In a ninth implementation form of the antenna according to the first aspect as such or any preceding implementation form of the first aspect, antenna elements of the antenna being polarized, and the antenna elements being center fed antenna elements.

In a tenth implementation form of the antenna according to the first aspect as such or any preceding implementation form of the first aspect, a total number of antenna elements of the antenna being scalable in accordance with an operating frequency of the antenna.

According to a second aspect, an antenna of a communication device is provided. The antenna comprising: a first antenna element; a second antenna element; a splitter having an input, a first output, and a second output, the input being operatively coupled to a transmitter of the communication device, the first output being operatively coupled to the first antenna element, the second output being operatively coupled to the second antenna element, the splitter being configured to adjust a gain and phase imbalance between the first and second antenna elements, the first antenna element being configured to radiate a first adjusted version of a first signal generated by the transmitter, and the second antenna element being configured to radiate a second adjusted version of the first signal generated by the transmitter; at least one third antenna element operatively coupled to at least one first reactive load, the at least one third antenna element configured to radiate a second signal modified in accordance with the at least one first reactive load, the second signal being induced at the at least one third antenna element by the first adjusted signal and the second adjusted signal, and the at least one first reactive load being configured to modify the second signal to destructively cancel with a third signal induced at the second antenna element by the first adjusted version of the first signal and the second adjusted version of the first signal; and a fourth antenna element operatively coupled to a receiver of the communication device, the fourth antenna element configured to receive signals.

In a first implementation form of the antenna according to the second aspect as such, further comprising at least one fifth antenna element operatively coupled to at least one second reactive load, the at least one fifth antenna element configured to radiate a fourth signal modified in accordance with the at least one second reactive load, the fourth signal being induced at the at least one fifth antenna element by the first adjusted signal and the second adjusted signal, and the at least one second reactive load being configured to modify the fourth signal to destructively cancel with the third signal induced at the second antenna element by the first adjusted version of the first signal and the second adjusted version of the first signal.

In a second implementation form of the antenna according to the second aspect as such or any preceding implementation form of the second aspect, the at least one first reactive load comprising at least one of an inductive load, a capacitive load, or a network of inductive and capacitive loads.

In a third implementation form of the antenna according to the second aspect as such or any preceding implementation form of the second aspect, the at least one second reactive load comprising at least one of an inductive load, a capacitive load, or a network of inductive and capacitive loads.

In a fourth implementation form of the antenna according to the second aspect as such or any preceding implementation form of the second aspect, the at least one third antenna element comprising two third antenna elements, the at least one first reactive load comprising two first reactive loads, each of the two third antenna elements being operatively coupled to one of the two first reactive loads, and the first antenna element, the second antenna element, and the two third antenna elements forming a transmitter cell.

In a fifth implementation form of the antenna according to the second aspect as such or any preceding implementation form of the second aspect, the two first reactive loads having different reactances.

In a sixth implementation form of the antenna according to the second aspect as such or any preceding implementation form of the second aspect, at least one fifth antenna element comprising three fifth antenna elements, the at least one second reactive load comprising three second reactive loads, each of the three fifth antenna elements being operatively coupled to one of the three second reactive loads, and the fourth antenna element and the three fifth antenna elements forming a transmitter cell.

In a seventh implementation form of the antenna according to the second aspect as such or any preceding implementation form of the second aspect, the three second reactive loads having different reactances.

In an eighth implementation form of the antenna according to the second aspect as such or any preceding implementation form of the second aspect, the fourth antenna element being located at a null of a radio frequency (RF) current produced by the first antenna element.

In a ninth implementation form of the antenna according to the second aspect as such or any preceding implementation form of the second aspect, antenna elements of the antenna being polarized, and the antenna elements being center fed antenna elements.

In a ninth implementation form of the antenna according to the second aspect as such or any preceding implementation form of the second aspect, a total number of antenna elements of the antenna being scalable in accordance with an operating frequency of the antenna.

According to a third aspect, a communication device including an antenna as recited in any preceding implementation form of the first or second aspects.

An advantage of a preferred embodiment is that the use of reactive terminations results in the signal coupled from the transmitter (TX) being re-radiated at all of the reactively terminated ports and to destructively cancel at the receiver (RX), thereby ensuring improved isolation between the TX and the RX.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Aspects of the present disclosure provide embodiment antenna systems with improved transmitter (TX)-receiver (RX) isolation. The antenna systems include an antenna array and a feeding network for feeding the antenna array for communications. The antenna array includes antenna elements having spacing between adjacent elements determined in accordance with a wavelength of the highest operating frequency to be handled by the array. In this way, different antenna elements can be provided in accordance with the desired operating frequencies to be handled by antenna elements. The feeding network is configured to feed different groups of antenna elements using feed signals in different frequency bands. An antenna element of the antenna array may be fed by a signal in one frequency band, by signals in more than one frequency band, or may not be fed at all. The antenna elements that are not fed may be reactively terminated. The reactively terminated antenna elements may be terminated with capacitors, inductors, or networks including capacitors and inductors. The reactive terminations re-radiate a signal coupled from the TX antenna elements to destructively cancel the signal at the RX antenna elements, thereby improving isolation between the TX and the RX.

Figure 1:
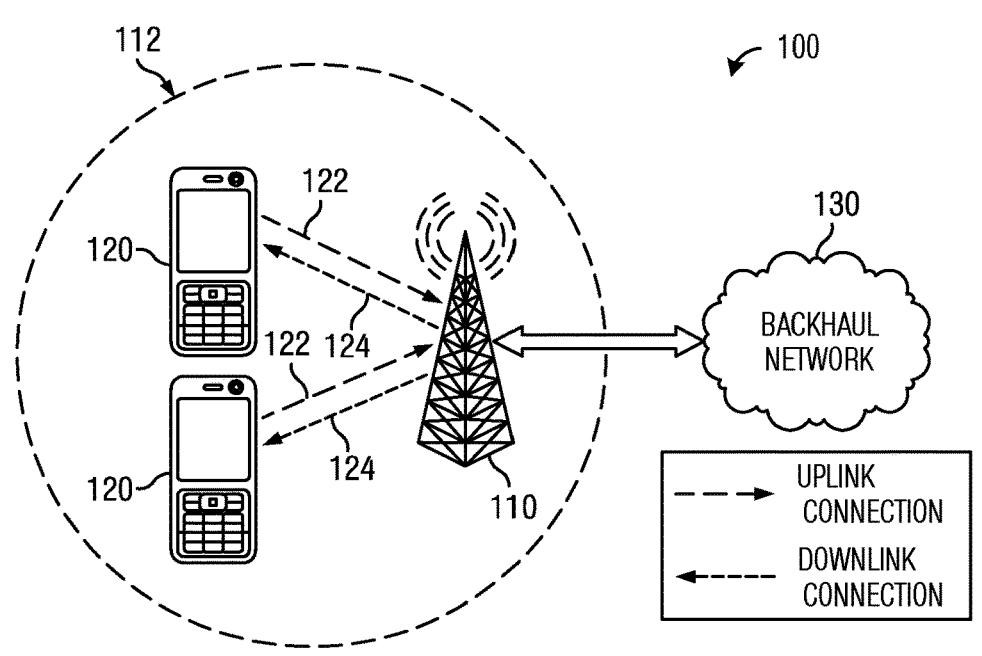
FIG. 1 illustrates a network for communicating data.

FIG. 1 illustrates a network 100 for communicating data. Network 100 comprises a base station no having a coverage area 112, a plurality of mobile devices 120, and a backhaul network 130. As shown, the base station no establishes uplink 122 and/or downlink 124 connections with the mobile devices 120, which connections serve to carry data from the mobile devices 120 to the base station no, and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB or gNB compliant with various 4G and 5G standards promulgated by 3GPP, and evolutions of such standards), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), 3GPP Rel. 15 and subsequent release, High Speed Packet Access (HSPA), Wi-Fi 802.11a/b/g/n/ac/ax/ay/be and other 802.11xx standards. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

As discussed previously, frequency division duplexed (FDD) communications systems, where transmissions occur over one or more frequency bands that differ from one or more frequency bands used for receptions, require isolation between the TX and the RX to help keep the TX noise from saturating the RX and hence, degrading RX sensitivity. In other words, a signal (at the RX) coupled from the TX saturates the RX and degrades RX sensitivity. The signal at the RX that is coupled from the TX is referred to herein as the coupled signal, while the signal from the TX is referred to herein as the transmitted signal.

Figure 2A:
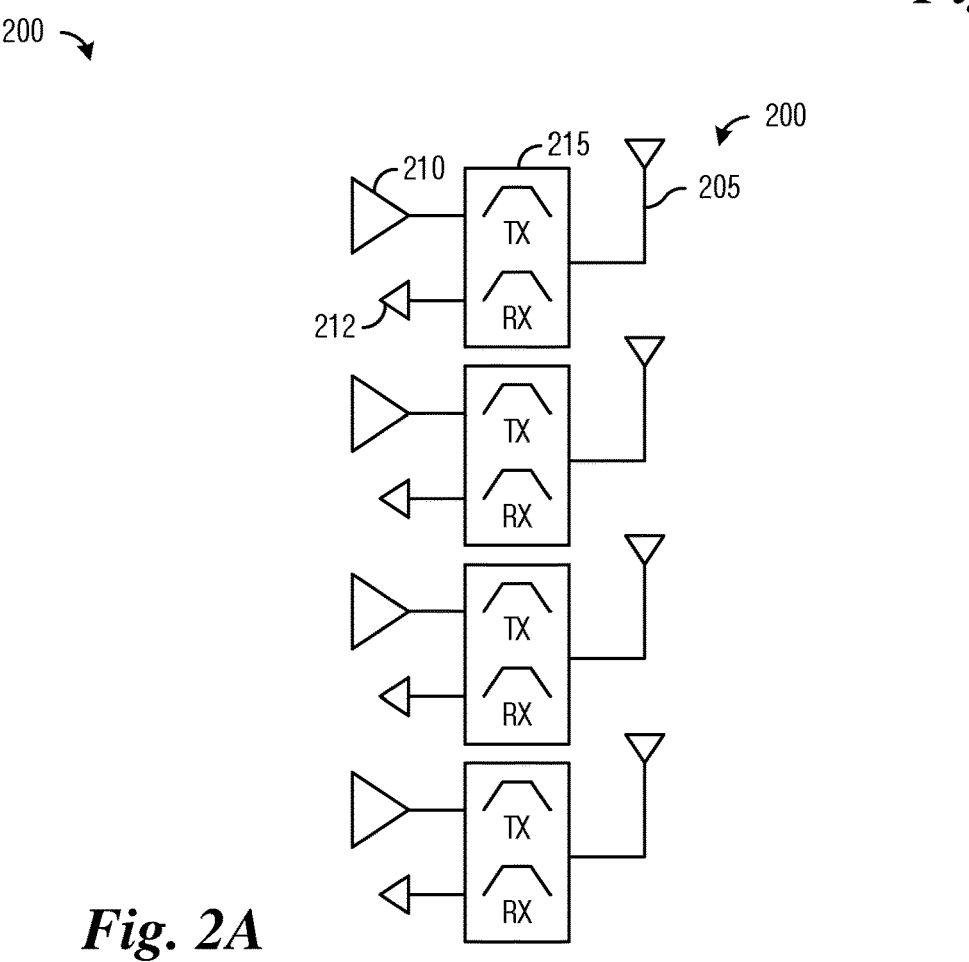
FIG. 2A illustrates an antenna system highlighting a first prior art technique for improving TX-RX isolation.

FIG. 2A illustrates an antenna system 200 highlighting a first prior art technique for improving TX-RX isolation. Antenna system 200 includes a plurality of antenna elements, such as antenna element 205, with each antenna element coupled to a TX port (such as TX port 210) and a RX port (such as RX port 212). Each of the antenna elements are shared by a TX-RX port pair. The prior art technique for improving TX-RX isolation also involves the addition of a transmit filter and a receive filter (TX-RX filters) between the TX-RX port pair and the corresponding antenna element. As an example, TX-RX filter 215 is added in between antenna element 205 and TX 210 and RX 212. The frequency response of the TX filter corresponds to the one or more frequency bands used for transmissions made by the TX-RX port pair, while the RX filter corresponds to the one or more frequency bands used for receptions made by the TX-RX port pair. Generally, the more stringent the filter masks (filter masks describe the frequency response of the filter, e.g., pass band width, stop band width, and transition band steepness, etc.), the better the isolation between the TX port and the RX port. However, filter complexity, cost, and size increases with increased filter mask stringency.

Figure 2B:
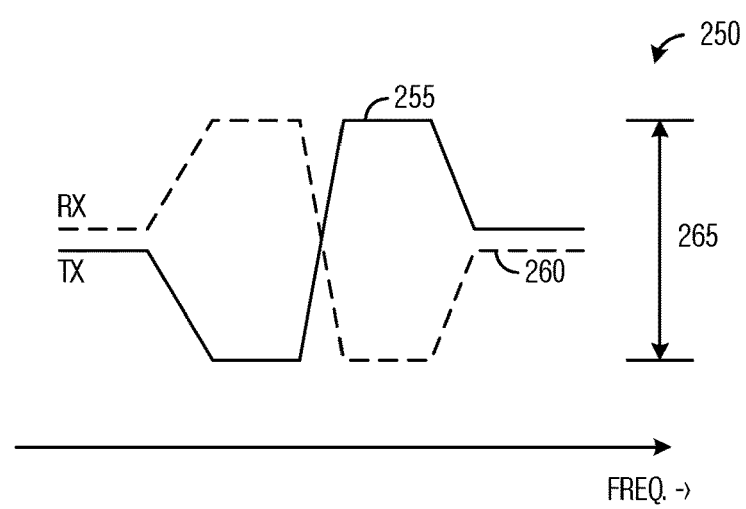
FIG. 2B illustrates a diagram of an example TX-RX filters frequency response for the first prior art technique for improving TX-RX isolation shown in FIG. 2A.

FIG. 2B illustrates a diagram 250 of an example TX-RX filters frequency response for the first prior art technique for improving TX-RX isolation shown in FIG. 2A. A solid line 255 represents the frequency response of the TX filter and a dashed line 260 represents the frequency response of the RX filter. In this example, the frequency band(s) used for reception are lower in frequency than the frequency band(s) used for transmission, but other arrangements are possible. Because only the TX-RX filters are used, a high isolation requirement (shown as span 265) is needed for RX sensitivity and TX emission blocking, and so forth. The high isolation requirement may be seen in the large magnitude difference between the pass and stop bands, as well as the rapid transition between the pass and stop bands.

Figure 3A:
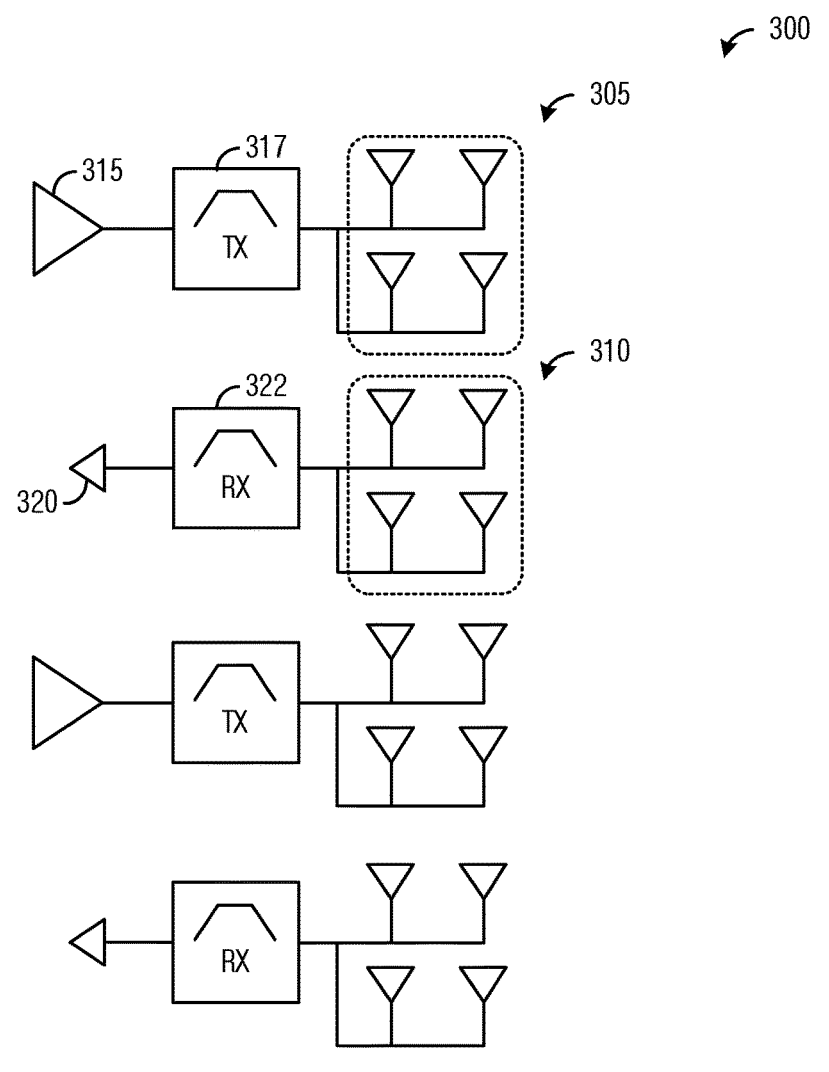
FIG. 3A illustrates an antenna system highlighting a second prior art technique for improving TX-RX isolation.

FIG. 3A illustrates an antenna system 300 highlighting a second prior art technique for improving TX-RX isolation. Antenna system 300 includes a plurality of antenna elements, with one or more antenna elements grouped into an antenna cluster, such as antenna cluster 305 and antenna cluster 310. Each antenna cluster is coupled to a TX port (such as TX port 315) or a RX port (such as RX port 320). Therefore, each antenna cluster is used only by a TX port or a RX port, enabling multiple antenna elements per port, as well as increased physical separation between TX and RX. The prior art technique for improving TX-RX isolation also involves the addition of a transmit filter (TX filter) or a receive filter (RX filter) between an antenna cluster and associated TX or RX port, rather than a combined TX-RX filter as shown in FIG. 2A. As an example, TX filter 317 is added in between antenna cluster 305 and TX port 315, while RX filter 322 is added in between antenna cluster 310 and RX port 320. The frequency response of the TX filter corresponds to the one or more frequency bands used for transmissions made by the TX port, while the RX filter corresponds to the one or more frequency bands used for receptions made by the RX port. The use of separate antennas for transmission and reception helps to reduce the TX-RX isolation requirements.

Figure 3B:
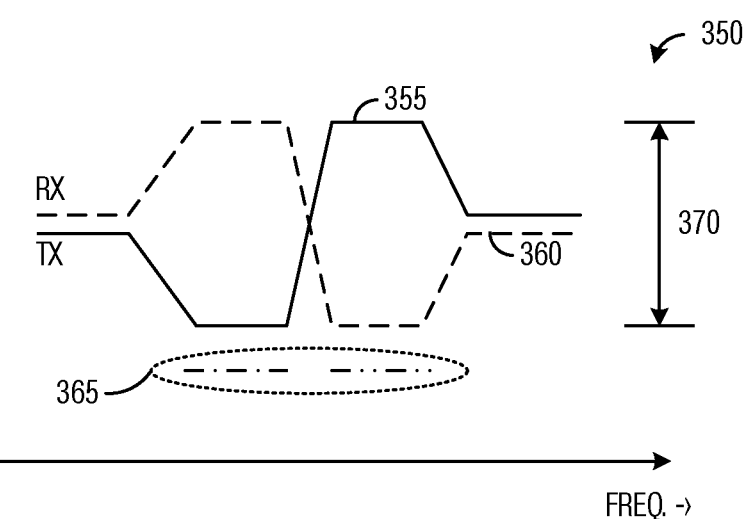
FIG. 3B illustrates a diagram of example TX and RX filters frequency responses for the second prior art technique for improving TX-RX isolation shown in FIG. 3A.

FIG. 3B illustrates a diagram 350 of example TX and RX filters frequency responses for the second prior art technique for improving TX-RX isolation shown in FIG. 3A. A solid line 355 represents the frequency response of the TX filter and a dashed line 360 represents the frequency response of the RX filter. In this example, the frequency band(s) used for reception are lower in frequency than the frequency band(s) used for transmission, but other arrangements are possible. A highlight 365 illustrates the stop band magnitudes for TX and RX of an antenna system utilizing the prior art technique shown in FIG. 2A. The use of separate antennas and antenna clusters for transmission and reception reduces the TX-RX isolation requirements (shown as span 370). However, the provision of separate antennas leads to poor antenna density, which negates the benefit of dense antenna arrays, such as tightly coupled dipole arrays (TCDAs).

Figure 4:
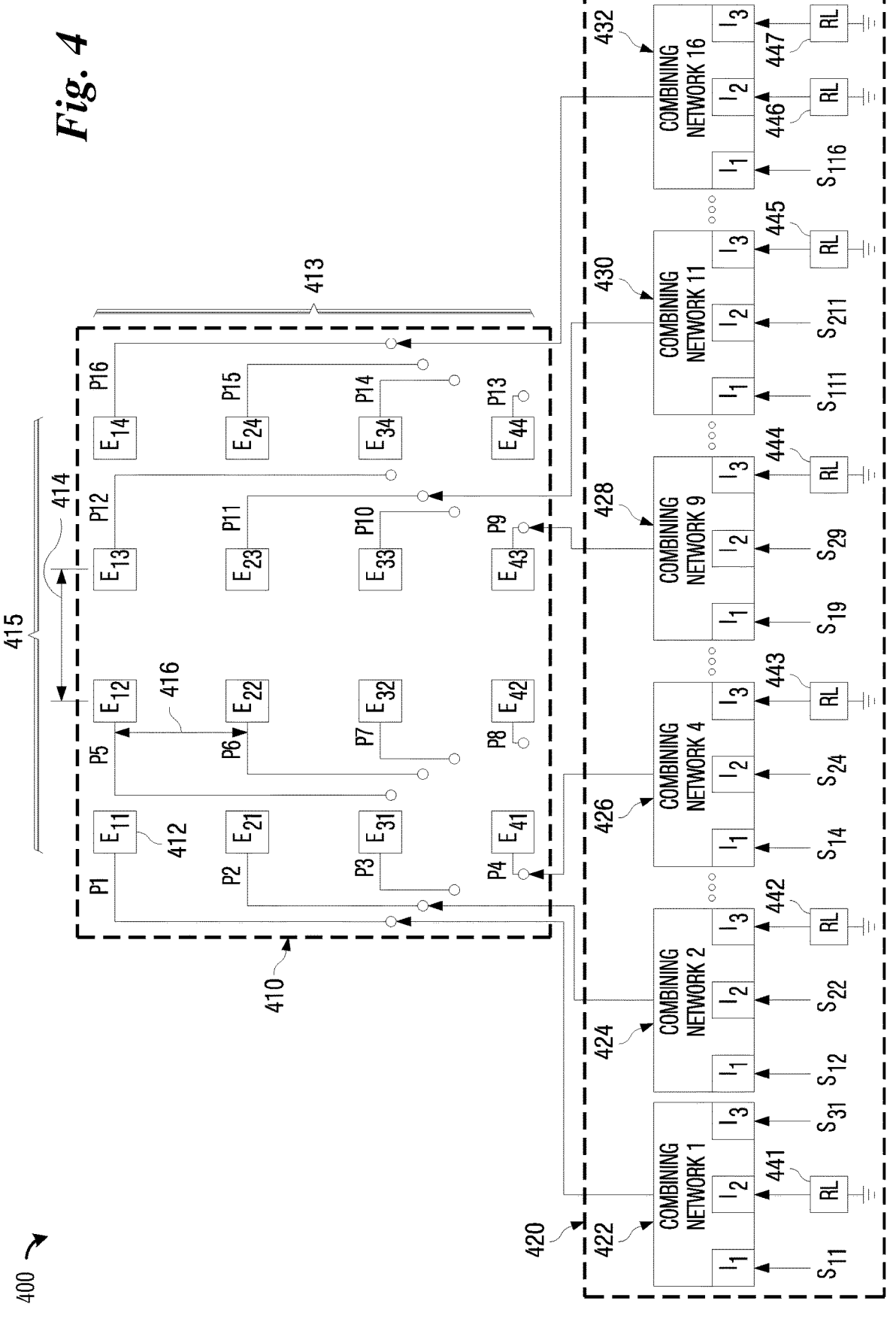
FIG. 4 illustrates a diagram of an example antenna system.

FIG. 4 illustrates a diagram of an example antenna system 400. The antenna system 400 includes a tightly coupled array (TCA) antenna 410 and a feeding network 420 for feeding TCA 410. TCA 410 includes a plurality of antenna elements 412, indicated by individual elements $E_{11}$, $E_{12}$, ... $E_{44}$, that are arranged in a plurality of rows 413 and columns 415. Each element 412 of the TCA 410 is represented by $E_{ij}$, where i=1, 2, . . . , n representing the ith row of the TCA 410, and j=1, 2, m representing the jth column of the TCA 410. $E_{ij}$ represents the element in the ith row and the jth column of the TCA 410. The antenna elements of the array 410 are equally spaced and closely arranged to one another on a planar surface, so that the array of antenna elements is tightly coupled electrically, magnetically, or both. In some examples, two antenna elements are tightly coupled when coupling strength between the two antenna elements is greater than −16 dB. In a typical example, spacing of two neighboring array elements in the same row or column, e.g., spacing 414 between elements $E_{12}$, $E_{13}$ or spacing 416 between elements $E_{12}$, $E_{22}$, may be equal to half of a wavelength at the highest operating frequency of the TCA. That is, the spacing is $\lambda_h/2$, where $\lambda$ represents a wavelength, and $\lambda_h$ represents a wavelength of the highest operating frequency for which the TCA is designed. In this regard, it is to be appreciated that TCAs can be provided for specific wavelengths or wavelength bands, in which case element spacing is provided accordingly. Neighboring array elements in the same row may be coupled, electrically, magnetically, or both, more tightly than neighboring array elements in adjacent rows. Such a TCA has demonstrated features such as low profile (or low height), high antenna efficiency, and small array areas or sizes that are of potential benefit for communications, including ultra wide band (UWB). For example, TCA in the art have demonstrated a bandwidth exceeding 4:1 (which is a ratio of a highest frequency to a lowest frequency). Spacing between a TCA and its associated electrical ground may merely be one-tenth of a wavelength of the lowest frequency of operation (i.e., $\lambda/10$). Radiation efficiencies may be greater than 50% across a frequency range of a TCA antenna.

The antenna elements may be in the form of small dipoles, arranged to form a TCDA. The dipoles are capacitively coupled, and placed above a conducting ground plane.

Communications using the TCDA in UWB may be achieved by tuning capacitive gaps between neighboring dipole tips. This makes it possible to support an almost uniform current along the coupled dipoles across a wide frequency range so that the radiation resistance stays constant.

FIG. 4 illustrates a 4×4 TCA (i.e., 4 rows 413 and 4 columns 415, thus including 16 antenna elements 412 ($E_{11}$-$E_{44}$) in total), for illustrative purposes. However, TCAs may vary in size and configuration, such as 4×6, 8×8, 16×16, etc. Each of the antenna elements 412 has a respective feed port, i.e., P1-P16, by which the antenna elements 412 are respectively fed with feed signals.

Conventionally, for a TCA operating at multiple different frequency bands, each of the array elements of the TCA is fed at all of the multiple frequency bands for transmission and reception. For example, if TCA 410 operates in N frequency bands, each antenna element 412 is fed by a combination of N signals from the N respective frequency bands. A combining network is provided for each antenna element, which combines N signals at the N frequency bands to generate a combined feed signal, and feeds the combined feed signal to each antenna element through a respective feed port. Thus, for feeding the 16 elements of TCA 410, 16 combining networks are needed. Each combining network may have a number of input nodes for receiving a number of feed signals in different frequency bands. The number of input nodes may be equal to the number of frequency bands that the TCA may operate. FIG. 4 shows a combining network 1 (422) that has N input nodes $I_1$, $I_2$, . . . $I_N$. The combining network 422 combines N signals $S_{11}$, $S_{21}$, . . . , $S_{N1}$ in the N frequency bands and feeds a combined signal to the feed port P1 for antenna element $E_{11}$. Similarly, a combining network 2 (424) combines N signals $S_{12}$, $S_{22}$, . . . , $S_{N2}$ in the N frequency bands (received from N input nodes $I_1$, $I_2$, . . . $I_N$ of the combining network 424) and feeds a combined signal to the feed port P2 for antenna element $E_{21}$. A combining network 16 (426) combines N signals $S_{116}$, $S_{216}$, . . . $S_{N16}$ in the N frequency bands and feeds a combined signal to the feed port P16 for antenna element $E_{14}$. In this example, Sij represents a feed signal in the ith frequency band for feeding feed port Pj, where i=1, 2, . . . , N, representing N frequency bands, and j=1, 2, . . . , 16, representing 16 feed ports of TCA 410. All the other antenna elements of the TCA 410 are fed similarly. For example, for element $E_{23}$ having the feed port P11, a combining network 11 (430) is provided, which combines N signals $S_{111}$, $S_{211}$, . . . , $S_{N11}$, and feeds a combined feed signal to the feed port P11.

According to an example embodiment, an antenna system with improved TX-RX isolation is provided. The antenna system includes an antenna array, e.g., a TCDA, having a relatively high antenna density, which can lead to poor isolation. Typically, in a TCDA, there are more antenna elements in the array than the number of TX and RX ports. In an embodiment, the antenna elements in excess of the number of TX and RX ports are reactively terminated so that a signal transmitted by a TX port is coupled (referred to herein as a first coupled signal) onto a reactively terminated antenna element located near the antenna element of the TX port. The reactive terminations cause the first coupled signals to re-radiate (referred to herein as re-radiated signals) from the reactively terminated antenna elements. The re-radiated signals are modified versions of the first coupled signals. The re-radiated signals are themselves coupled onto nearby antenna elements, including the antenna elements of RX ports, and are referred to herein as second coupled signals. In an embodiment, the reactive terminations are selected so that, at the antenna elements of the RX ports, the second coupled signals destructively combine with the first coupled signal. Hence, the more closely matched (in terms of destructive combining) the second coupled signals are to the first coupled signals, the better the TX-RX isolation. As an example, if the first coupled signal is totally out of phase with the second coupled signal, there is absolute destructive combining and the combined first and second coupled signals would be zero.

In other words, the transmissions of a TX port at an antenna element result in first coupled signals at antenna elements that are in close proximity to the antenna element of the TX port. If the antenna elements are reactively terminated, the first coupled signals are re-radiated by the reactively terminated antenna elements. These re-radiated signals also induce second coupled signals at nearby antenna elements. At the RX port closely located to the TX port, the second coupled signals arising from the re-radiated signals destructively combine with the first coupled signals arising from the transmissions made by the TX port, thereby reducing the magnitude of the first coupled signals arising from the transmissions made by the TX port and enhancing the TX-RX isolation.

In an embodiment, the reactive terminations comprise capacitors, inductors, or networks of capacitors and inductors. In an embodiment, the reactive terminations are selected so that the first coupled signals are totally reflected and re-radiated back out the antenna elements. As an example, the values of the reactive terminations are based on the design (e.g., dimensions, spacing, operating frequency, type, and so on) of the antenna elements and the antenna system. The values of the reactive terminations are selected so that the first coupled signals at the antenna elements that are reactively terminated are re-radiated and cancel the first coupled signals at the antenna element coupled to the receiver port. The first coupled signals are re-radiated only modified by the reactance value of the reactive terminations. In an embodiment, the reactive terminations are selected for each antenna element not coupled to a TX port or RX port so that the second coupled signals arising from the re-radiated signals destructively combine with the first coupled signals arising from the transmissions made by the TX port. The use of the reactive terminations enables a relaxation of the frequency response of the TX or RX filters because a portion of the filter frequency response requirements is shifted into the antenna array. As an example, the TX or RX filters do not need to have as flat a pass band or stop band, or the order of the TX or RX filters do not need to be as high (impacting the slope of the transition from pass to stop bands).

In an embodiment, each antenna element not coupled to a TX port or RX port is reactively terminated. In an embodiment, the reactive terminations of each antenna element not coupled to a TX port or RX port within a single virtual cell are equal. In an embodiment, some of the reactive terminations of each antenna element not coupled to a TX port or RX port within a single virtual cell are different. In an embodiment, the reactive terminations of each antenna element not coupled to a TX port or RX port of a single antenna system are equal. In an embodiment, some of the reactive terminations of each antenna element not coupled to a TX port or RX port of a single antenna system are different.

Figure 5:
FIG. 5 illustrates an antenna system highlighting reactively terminated antenna elements according to example embodiments presented herein.
Figure 5:
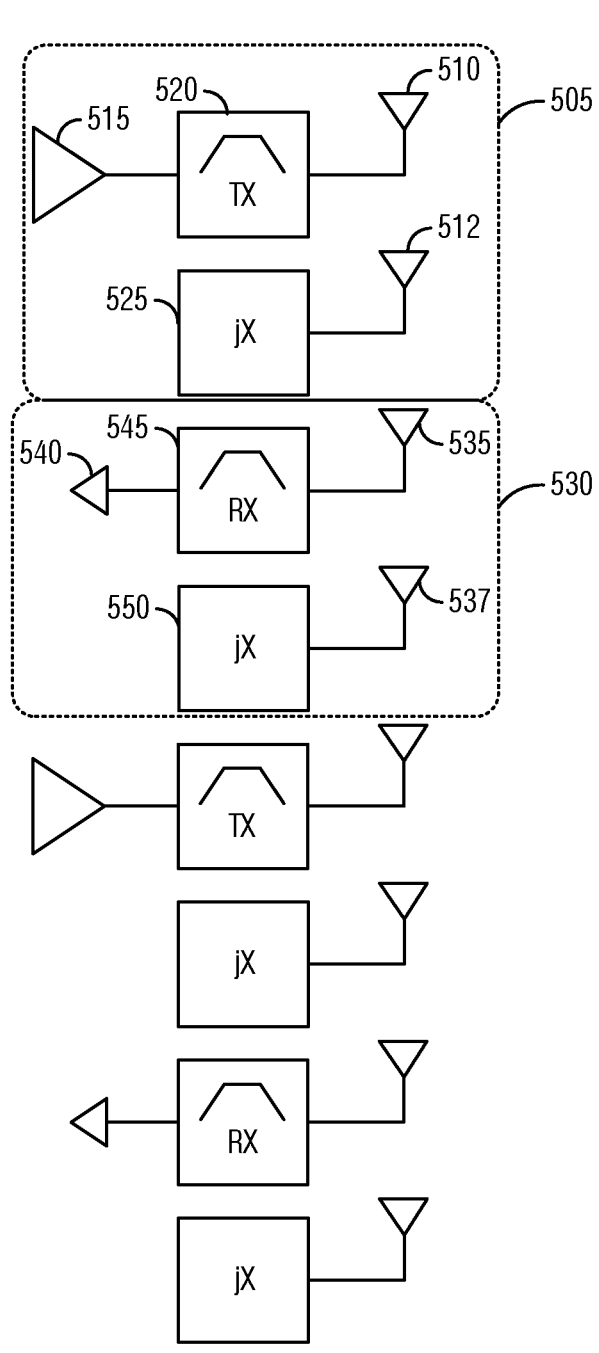

FIG. 5 illustrates an antenna system 500 highlighting reactively terminated antenna elements. Antenna system 500 includes a plurality of virtual cells, such as virtual TX cell 505 and virtual RX cell 530. Virtual TX cell 505 includes two antenna elements 510 and 512. Antenna element 510 is coupled to a TX port 515 with a TX filter 520 located in between. Virtual TX cell 505 also includes antenna element 512 that is coupled to a reactive termination 525. Virtual RX cell 530 includes two antenna elements 535 and 537. Antenna element 530 is coupled to a RX port 540 with a TX filter 545 located in between. Virtual RX cell 550 also includes antenna element 537 that is coupled to a reactive termination 550. Although the virtual cells of antenna system 500 are shown as having two antenna elements and one port (TX or RX) each, each virtual cell may have more than two antenna elements and one or more port (TX or RX) each. Furthermore, the virtual cells may have differing antenna element counts and port counts.

Although shown in FIG. 5 as including one reactively terminated antenna element, a virtual TX cell or a virtual RX cell may include one or more reactively terminated antenna element. In a situation where there are two or more reactively terminated antenna elements in a virtual TX or RX cell, the reactive terminations may be the same or the reactive terminations may be different.

In an embodiment, the values of the reactive terminations (e.g., reactive termination 525 and reactive termination 550) are selected so that the second coupled signals arising from the re-radiated signals from the antenna elements coupled to the reactive terminations (e.g., antenna element 512 and antenna element 537) destructively combine with the first coupled signals arising from the transmissions made by the TX port (e.g., TX port 515) and associated antenna element (e.g., antenna element 510).

The re-radiated signals at the reactively terminated antenna elements are modified versions of the first coupled signals at the reactively terminated antenna elements arising from the transmissions made by the TX port, where the re-radiated signals are the first coupled signals modified by the reactance value of the reactive termination. In other words, the re-radiated signals are changed by the reactive load. Assuming lossless reactive components, the changes to the re-radiated signals occur mainly to the phase of the re-radiated signals. For practical reactive components (i.e., lossy reactive components), the changes to the re-radiated signals will be to both the phase and magnitude of the re-radiated signals.

In an embodiment, each virtual cell of an antenna array comprises one antenna element coupled to a TX or RX port and one or more antenna elements coupled to reactive terminations. The antenna system comprises a plurality of virtual TX cells and a plurality of virtual RX cells, with one antenna element of each virtual cell coupled to a TX port of a RX port (depending on the type of virtual cell, i.e., virtual TX cell or virtual RX cell) and remaining antenna elements of each virtual cell coupled to a reactive termination. In an embodiment, the reactive terminations within a virtual cell are equal. In an embodiment, the reactive terminations within a virtual cell may differ.

In an embodiment, each virtual cell of an antenna system comprises one or more antenna elements coupled to one or more TX or RX ports and one or more antenna elements coupled to reactive terminations.

Figure 6A:
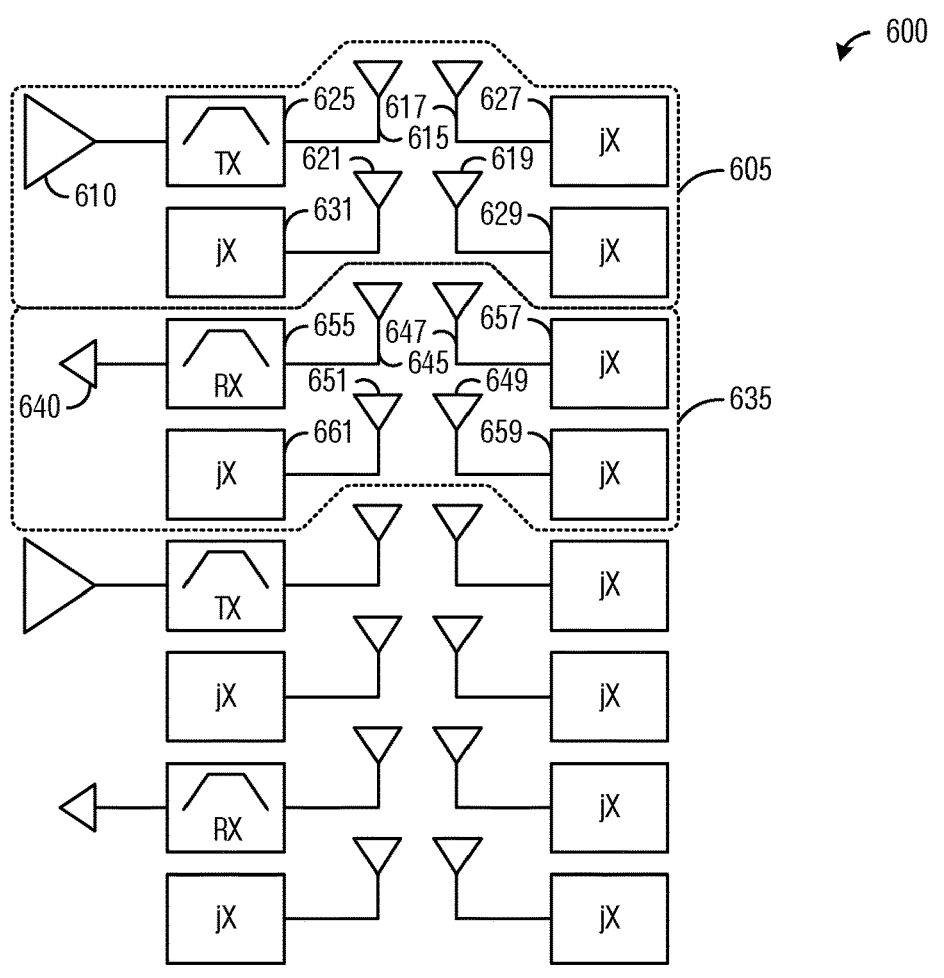
FIG. 6A illustrates an example antenna system highlighting virtual cells with reactively terminated antenna elements according to example embodiments presented herein.

FIG. 6A illustrates an example antenna system 600 highlighting virtual cells with reactively terminated antenna elements. Antenna system 600 comprises virtual cells, such as virtual TX cell 605 and virtual RX cell 635. Virtual TX cell 605 includes a TX port 610 coupled to an antenna element 615 with a TX filter 625 located in between. Virtual TX cell 605 also includes a plurality of antenna elements coupled to reactive terminations, such as antenna elements 617, 619, and 621 coupled to reactive terminations 627, 629, and 631, respectively. Other virtual TX cells may have the same number of antenna elements and reactive terminations. In an embodiment, other virtual TX cells have different numbers of antenna elements and reactive terminations. In an embodiment, in a virtual TX cell with multiple reactive terminations, the reactive terminations are equal. In an embodiment, in a virtual TX cell with multiple reactive terminations, at least some of the reactive terminations are different.

Virtual RX cell 635 includes a RX port 640 coupled to an antenna element 645 with a RX filter 655 located in between. Virtual RX cell 635 also includes a plurality of antenna elements coupled to reactive terminations, such as antenna elements 647, 649, and 651 coupled to reactive terminations 657, 659, and 661, respectively. Other virtual RX cells may have the same number of antenna elements and reactive terminations. In an embodiment, other virtual RX cells have different numbers of antenna elements and reactive terminations. In an embodiment, in a virtual RX cell with multiple reactive terminations, the reactive terminations are equal. In an embodiment, in a virtual RX cell with multiple reactive terminations, at least some of the reactive terminations are different.

Figure 6B:
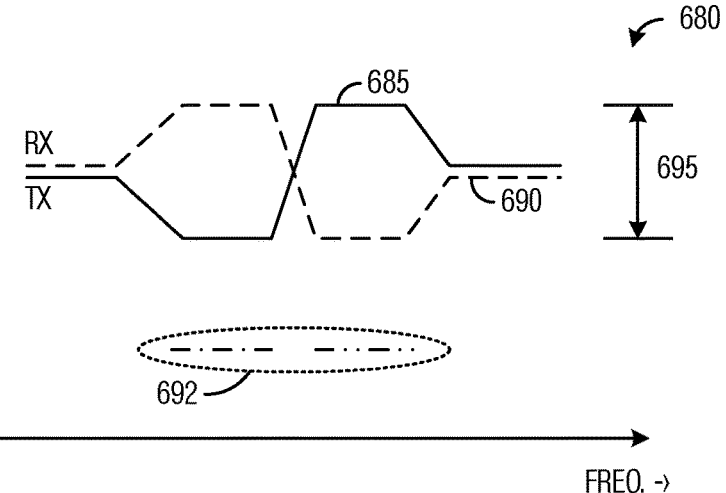
FIG. 6B illustrates a diagram of an example TX-RX filters frequency response of an example antenna system with virtual cells and reactively terminated antenna elements as shown in FIG. 6A according to example embodiments presented herein.

FIG. 6B illustrates a diagram 680 of an example TX-RX filters frequency response of an example antenna system with virtual cells and reactively terminated antenna elements as shown in FIG. 6A. A solid line 685 represents the frequency response of the TX filter and a dashed line 690 represents the frequency response of the RX filter. In this example, the frequency band(s) used for reception are lower in frequency than the frequency band(s) used for transmission, but other arrangements are possible. A highlight 692 illustrates the stop band magnitudes for TX and RX of an antenna system utilizing the prior art technique shown in FIG. 2A. The use of virtual cells and reactively terminated antenna elements reduces the TX-RX isolation requirements (shown as span 695).

Figure 7:
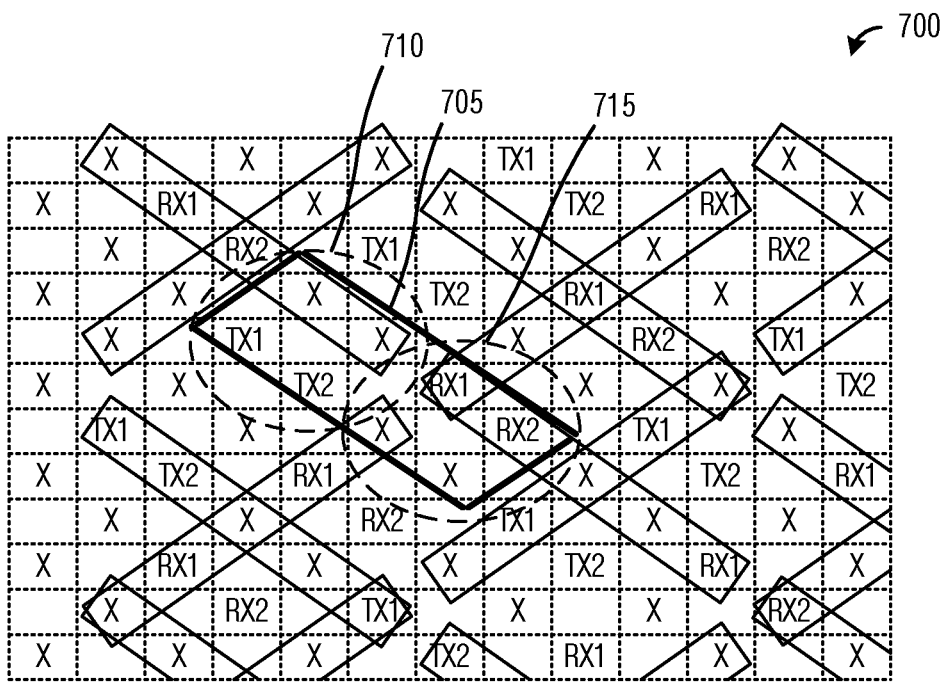
FIG. 7 illustrates a diagram highlighting a layout of an example antenna array with virtual cells and reactively terminated antenna elements according to example embodiments presented herein.

FIG. 7 illustrates a diagram 700 highlighting a layout of an example antenna array with virtual cells and reactively terminated antenna elements. As shown in FIG. 7, antenna elements coupled to TX ports are labeled "TX" and antenna elements coupled to RX ports are labeled "RX", while reactively terminated antenna elements are labeled "X". A virtual unit cell 705 includes a virtual TX cell 710 comprising a first antenna element coupled to a first TX port, a second antenna element coupled to a second TX port, and two antenna elements reactively terminated. Virtual unit cell 705 also includes a virtual RX cell 715 comprising a first antenna element coupled to a first RX port, a second antenna element coupled to a second RX port, and two antenna elements reactively terminated.

In an embodiment, each virtual TX cell of antenna array comprises two or more antenna elements coupled to one TX port, and the two or more antenna elements are driven by a splitter with appropriate amplitude, gain, or both amplitude and gain outputs. Example amplitudes range from about 3 dB to about 20 dB, while example phases range from about 0 degrees to about 360 degrees, with the amplitude or phase of a first output of the splitter being potentially different from a second output of the splitter. In an embodiment, the splitter with appropriate amplitude or gain outputs splits a signal at its input into two or more outputs. A splitter with appropriate amplitude or gain outputs may allow for the splitting of the signal at its input into multiple signals at its multiple output ports with different relative magnitudes and relative phases. The use of the splitter adjusts the gain and phase impedances between the signals at the output ports.

Conventional splitters typically split the signal at its input equally in magnitude and phase at the output ports. In an embodiment, the splitter with appropriate amplitude or gain outputs allows for adjustments in a gain and phase imbalance between the two or more outputs (coupled to antenna elements). Remaining antenna elements in the virtual TX cell have reactive terminations, for example. In an embodiment, the reactive terminations within a virtual cell are equal. In an embodiment, the reactive terminations within a virtual cell may differ.

Figure 8A:
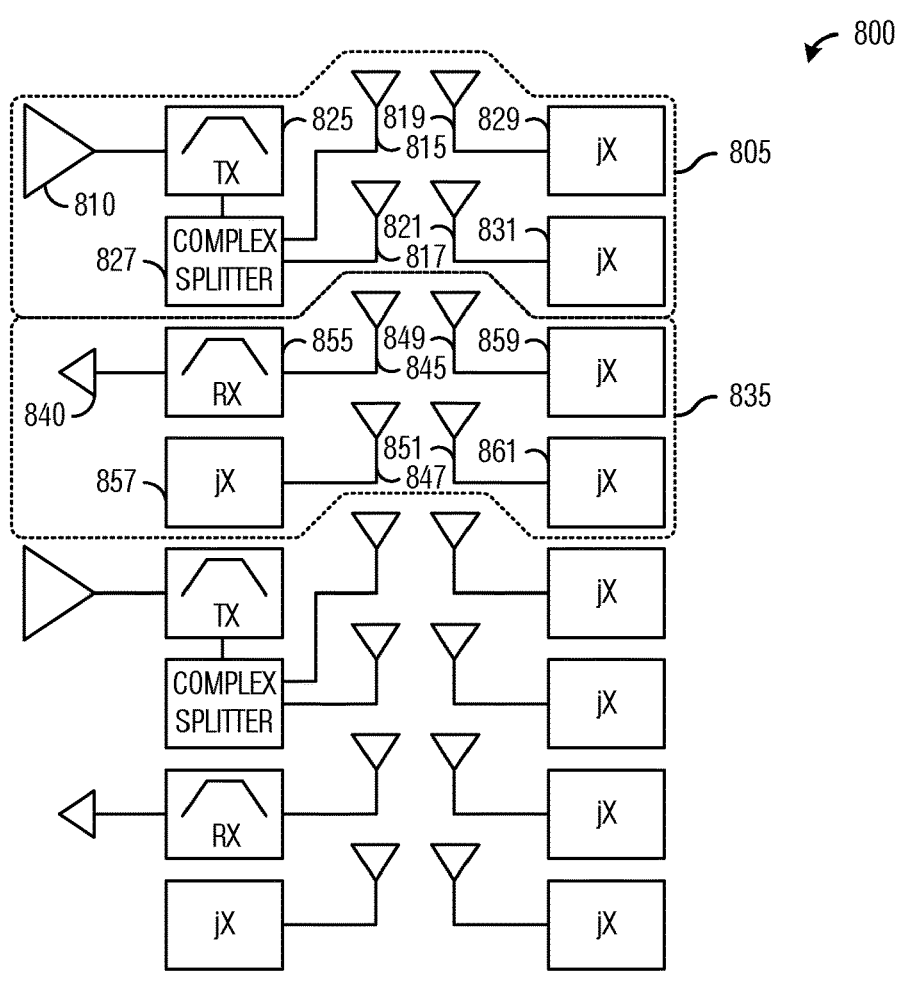
FIG. 8A illustrates an example antenna system highlighting virtual cells with reactively terminated antenna elements and splitters according to example embodiments presented herein.

FIG. 8A illustrates an example antenna system 800 highlighting virtual cells with reactively terminated antenna elements and splitters. Antenna system 800 comprises virtual cells, such as virtual TX cell 805 and virtual RX cell 835. Virtual TX cell 805 includes a TX port 810 coupled to two or more antenna elements (such as antenna elements 815 and 817). Between TX port 810 and the two or more antenna elements are TX filter 825 and a splitter 827. Splitter 827 splits a signal produced by TX port 810 into two or more outputs, with one output for each of the two or more antenna elements. Splitter 827 allows for adjustments in a gain and phase imbalance between the two or more outputs. Virtual TX cell 805 also includes a plurality of antenna elements coupled to reactive terminations, such as antenna elements 819, and 821 coupled to reactive terminations 829, and 831, respectively. Other virtual TX cells may have the same number of antenna elements and reactive terminations. In an embodiment, other virtual TX cells have different numbers of antenna elements and reactive terminations. In an embodiment, in a virtual TX cell with multiple reactive terminations, the reactive terminations are equal. In an embodiment, in a virtual TX cell with multiple reactive terminations, at least some of the reactive terminations are different.

Virtual RX cell 835 includes a RX port 840 coupled to an antenna element 845 with a RX filter 855 located in between. Virtual RX cell 835 also includes a plurality of antenna elements coupled to reactive terminations, such as antenna elements 847, 849, and 851 coupled to reactive terminations 857, 859, and 861, respectively. Other virtual RX cells may have the same number of antenna elements and reactive terminations. In an embodiment, other virtual RX cells have different numbers of antenna elements and reactive terminations. In an embodiment, in a virtual RX cell with multiple reactive terminations, the reactive terminations are equal. In an embodiment, in a virtual RX cell with multiple reactive terminations, at least some of the reactive terminations are different.

Figure 8B:
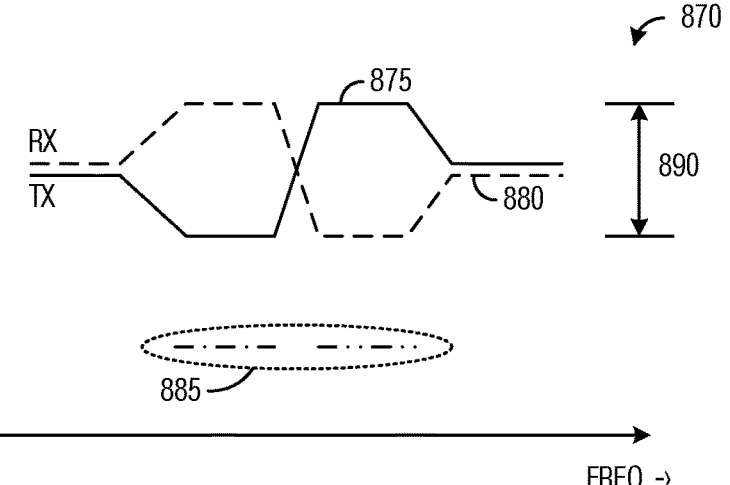
FIG. 8B illustrates a diagram of an example TX-RX filters frequency response of an example antenna system with virtual cells and reactively terminated antenna elements and filters as shown in FIG. 8A according to example embodiments presented herein.

FIG. 8B illustrates a diagram 880 of an example TX-RX filters frequency response of an example antenna system with virtual cells and reactively terminated antenna elements and filters as shown in FIG. 8A. A solid line 875 represents the frequency response of the TX filter and a dashed line 880 represents the frequency response of the RX filter. In this example, the frequency band(s) used for reception are lower in frequency than the frequency band(s) used for transmission, but other arrangements are possible. A highlight 885 illustrates the stop band magnitudes for TX and RX of an antenna system utilizing the prior art technique shown in FIG. 2A. The use of virtual cells and reactively terminated antenna elements reduces the TX-RX isolation requirements (shown as span 890).

According to an example embodiment, the size of virtual cells also has an impact on the TX-RX isolation. In TCAs, the radio frequency (RF) current is continuous along the row of antenna elements. The RF current has maximums (e.g., peaks) and minimums (e.g., nulls) at locations along the row based on the frequency of operation (i.e., the wavelength). Therefore, if the TCA (i.e., the antenna elements, RX ports, and TX ports) is designed in such a way that the RX ports are located at the RF current minimums, coupling is reduced or eliminated, thereby improving TX-RX isolation. In general, virtual cells that are larger have greater flexibility in the placement of the TX ports and RX ports, hence there are more options for placing the RX ports to reduce coupling.

Figure 9A:
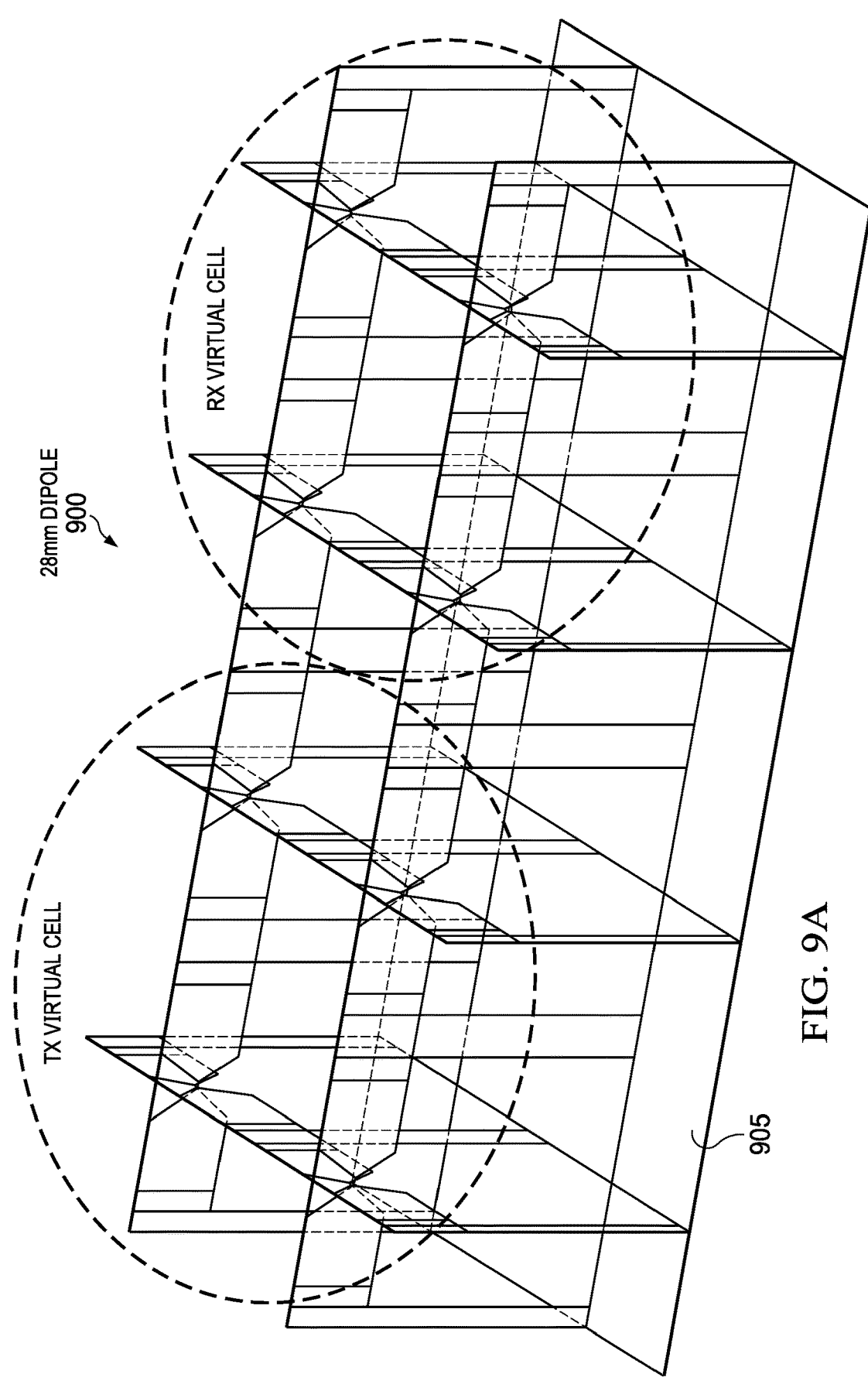
FIGS. 9A-9B illustrate diagrams of example virtual TX cell and virtual RX cell for a 28 mm and a 40 mm dipole antenna element according to example embodiments presented herein.
Figure 9B:
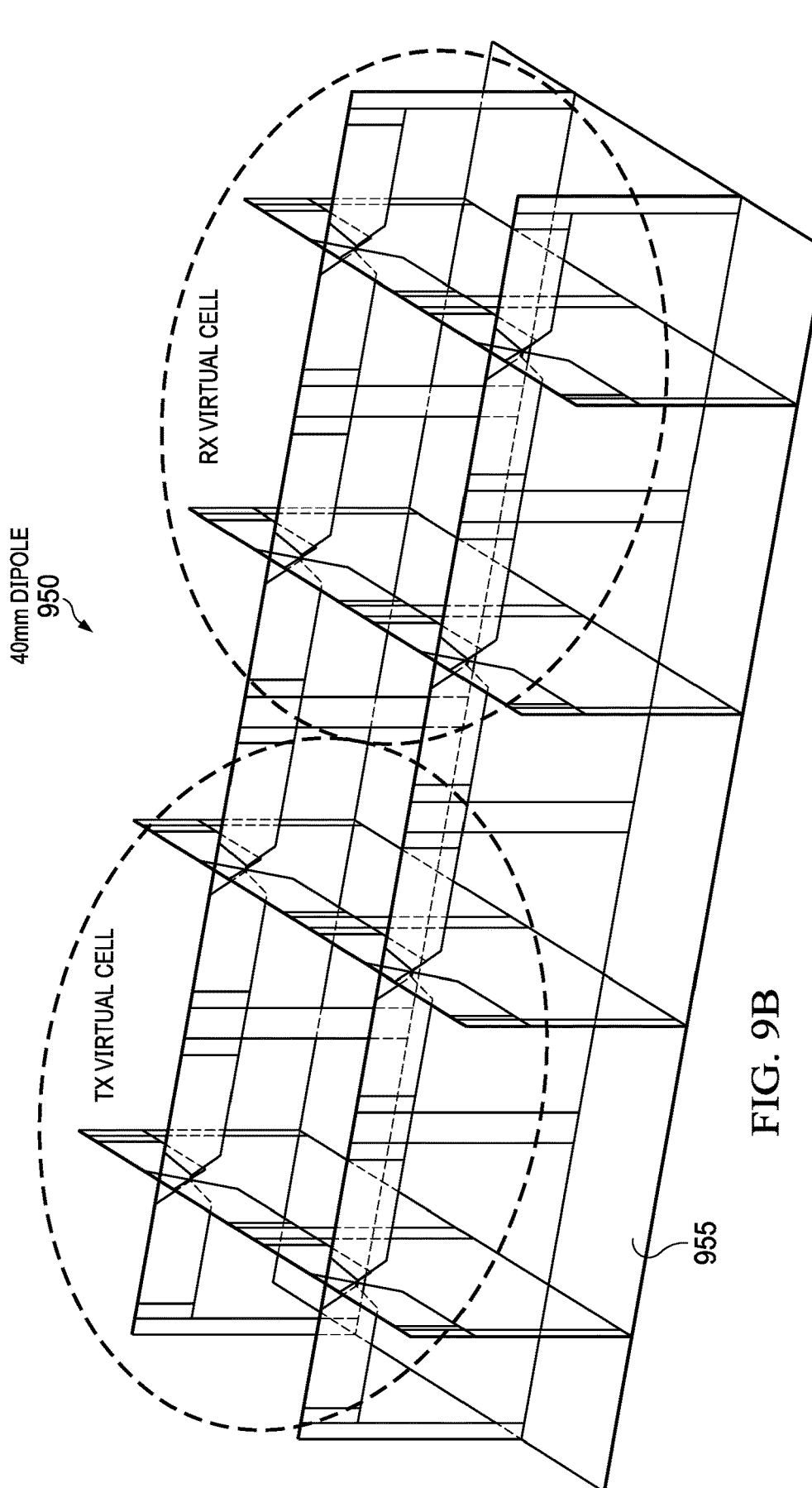

FIG. 9A illustrates a diagram 900 of example virtual TX cell and virtual RX cell for a 28 mm dipole antenna element. FIG. 9B illustrates a diagram 950 of example virtual TX cell and virtual RX cell for a 40 mm dipole antenna element. The example virtual TX cells and virtual RX cells shown in FIGS. 9A and 9B are disposed over ground planes 905 and 955, respectively.

According to an example embodiment, the crossing configuration of antenna elements also has an impact on the isolation between two orthogonally-polarized (or perpendicular) antenna elements. Observations of the current distribution in a virtual unit cell illustrates that the center-crossing dipole antenna element has better isolation performance over a frequency range than the edge-crossing dipole antenna element.

Figure 10B:
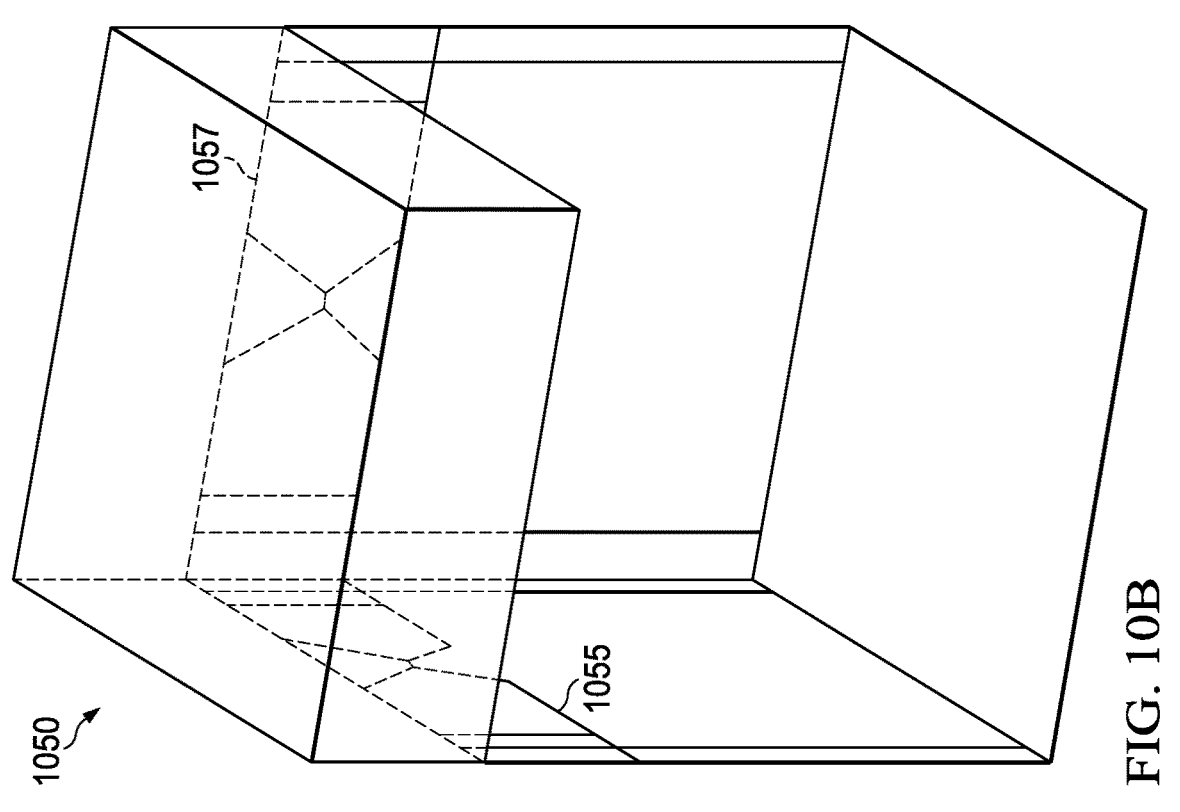
FIGS. 10A-10B illustrate diagrams of a center-crossing dipole antenna element and an edge-crossing dipole antenna element according to example embodiments presented herein.
Figure 10A:
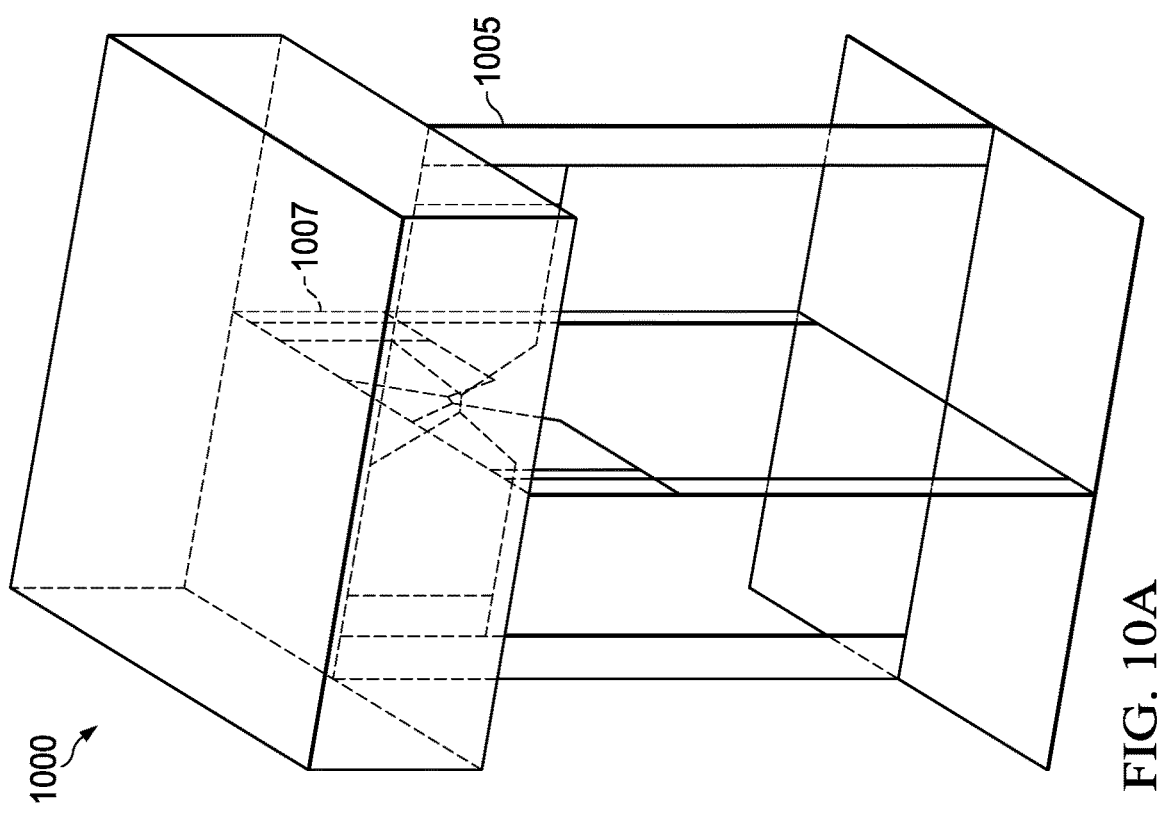

FIG. 10A illustrates a diagram 1000 of a center-crossing dipole antenna element. As shown in FIG. 10A, two orthogonal antenna elements 1005 and 1007 intersect at the center of the antenna elements, hence the antenna elements are referred to as "center-crossing" elements. FIG. 10B illustrates a diagram 1050 of an edge-crossing dipole antenna element. As shown in FIG. 10B, two orthogonal antenna elements 1055 and 1057 intersect at edges of the antenna elements, hence the antenna elements are referred to as "edge-crossing" elements.

According to an example embodiment, a number of antenna elements in virtual cell is scalable in accordance with the operating frequency of the virtual cell. In an embodiment, at lower operating frequencies, where the wavelength is long, the number of antenna elements (n) is larger. As an example, at lower operating frequencies, n is approximately $(\lambda/2/\text{length})^2$, where $\lambda$ is the operating wavelength, and length is the length of a single antenna element. In an embodiment, at higher operating frequencies, where the wavelength is small, the number of antenna elements n is small. As an example, at lower operating frequencies, n is approximately $x^2$, where x is an integer value. As shown in the figures presented in this disclosure, the virtual cells are shown with four antenna elements. However, at lower frequencies, each virtual cell may have nine or more antenna elements. The values four and nine are illustrative examples and are not intended to be limiting to the scope of the example embodiments.

Figure 11A:
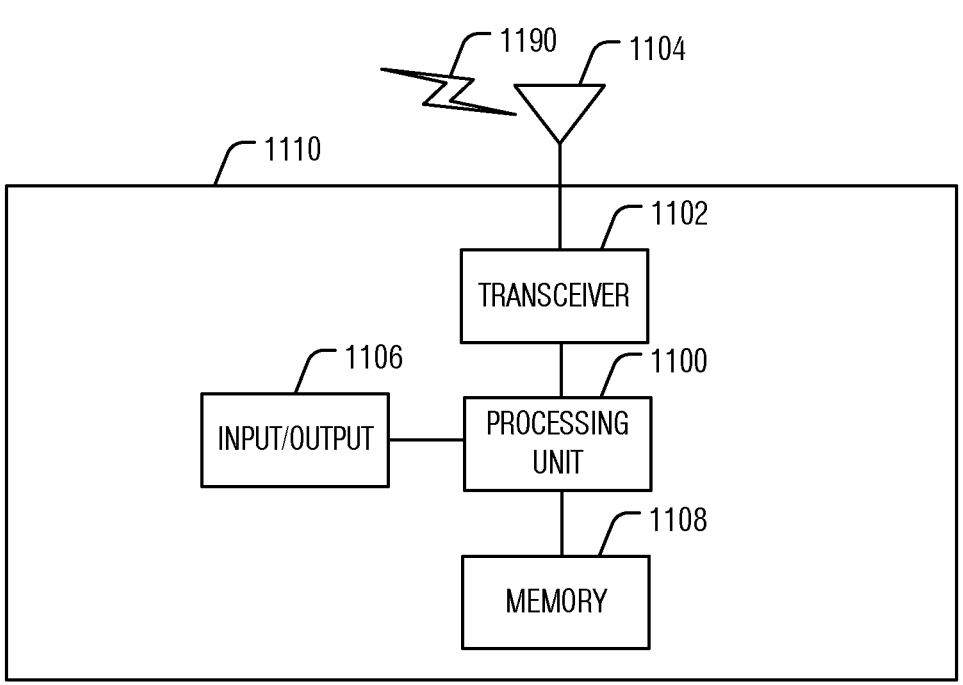
FIGS. 11A and 11B illustrate example devices that may implement the methods and teachings according to this disclosure.
Figure 11B:
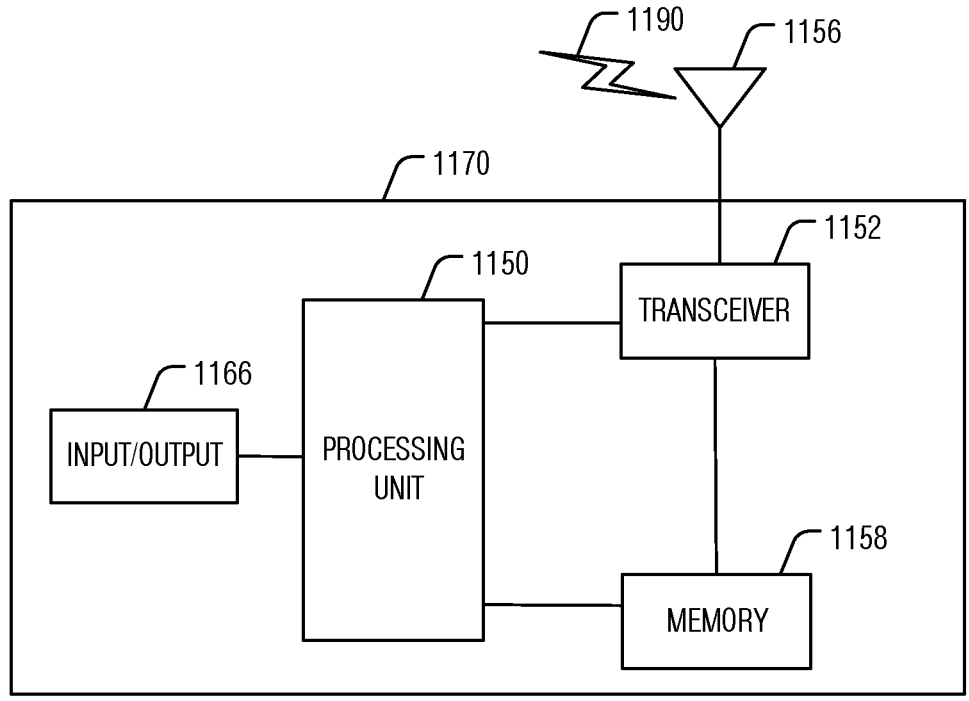

FIGS. 11A and 11B illustrate example devices that may implement the methods and teachings according to this disclosure. In particular, FIG. 11A illustrates an example electronic device (ED) 1110, and FIG. 11B illustrates an example base station 1170. These components could be used in a system.

As shown in FIG. 11A, the ED 1110 includes at least one processing unit 1100. The processing unit 1100 implements various processing operations of the ED 1110. For example, the processing unit 1100 could perform signal coding, data processing, power control, input/output processing, or any other functionality enabling the ED 1110 to operate in the system. The processing unit 1100 also supports the methods and teachings described in more detail above. Each processing unit 1100 includes any suitable processing or computing device configured to perform one or more operations. Each processing unit 1100 could, for example, include a microprocessor, microcontroller, digital signal processor, field programmable gate array, or application specific integrated circuit.

The ED 1110 also includes at least one transceiver 1102. The transceiver 1102 is configured to modulate data or other content for transmission by at least one antenna or NIC (Network Interface Controller) 1104. The at least one antenna 1104 may be an antenna array with reactive terminations, as described herein. The transceiver 1102 is also configured to demodulate data or other content received by the at least one antenna 1104. Each transceiver 1102 includes any suitable structure for generating signals for wireless or wired transmission or processing signals received wirelessly or by wire. Each antenna 1104 includes any suitable structure for transmitting or receiving wireless or wired signals. One or multiple transceivers 1102 could be used in the ED 1110, and one or multiple antennas 1104 could be used in the ED 1110. Although shown as a single functional unit, a transceiver 1102 could also be implemented using at least one transmitter and at least one separate receiver.

The ED 1110 further includes one or more input/output devices 1106 or interfaces (such as a wired interface to the Internet). The input/output devices 1106 facilitate interaction with a user or other devices (network communications) in the network. Each input/output device 1106 includes any suitable structure for providing information to or receiving information from a user, such as a speaker, microphone, keypad, keyboard, display, or touch screen, including network interface communications.

In addition, the ED 1110 includes at least one memory 1108. The memory 1108 stores instructions and data used, generated, or collected by the ED 1110. For example, the memory 1108 could store software or firmware instructions executed by the processing unit(s) 1100 and data used to reduce or eliminate interference in incoming signals. Each memory 1108 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 11B, the base station 1170 includes at least one processing unit 1150, at least one transceiver 1152, which includes functionality for a transmitter and a receiver, one or more antennas 1156, at least one memory 1158, and one or more input/output devices or interfaces 1166. The at least one antenna 1156 may an antenna array with reactive terminations, as described herein. A scheduler, which would be understood by one skilled in the art, is coupled to the processing unit 1150. The scheduler could be included within or operated separately from the base station 1170. The processing unit 1150 implements various processing operations of the base station 1170, such as signal coding, data processing, power control, input/output processing, or any other functionality. The processing unit 1150 can also support the methods and teachings described in more detail above. Each processing unit 1150 includes any suitable processing or computing device configured to perform one or more operations. Each processing unit 1150 could, for example, include a microprocessor, microcontroller, digital signal processor, field programmable gate array, or application specific integrated circuit.

Each transceiver 1152 includes any suitable structure for generating signals for wireless or wired transmission to one or more EDs or other devices. Each transceiver 1152 further includes any suitable structure for processing signals received wirelessly or by wire from one or more EDs or other devices. Although shown combined as a transceiver 1152, a transmitter and a receiver could be separate components. Each antenna 1156 includes any suitable structure for transmitting or receiving wireless or wired signals. While a common antenna 1156 is shown here as being coupled to the transceiver 1152, one or more antennas 1156 could be coupled to the transceiver(s) 1152, allowing separate antennas 1156 to be coupled to the transmitter and the receiver if equipped as separate components. Each memory 1158 includes any suitable volatile or non-volatile storage and retrieval device(s). Each input/output device 1166 facilitates interaction with a user or other devices (network communications) in the network. Each input/output device 1166 includes any suitable structure for providing information to or receiving/providing information from a user, including network interface communications.

Although the present disclosure and its advantages have been described in detail, it should be understood that various changes, substitutions and alterations can be made herein without departing from the scope of the disclosure as defined by the appended claims.

What is claimed is:

1. A communication device, comprising:
   a transmitter;
   a receiver; and
   an antenna, the antenna including:
   a first antenna element coupled to the transmitter, the first antenna element being configured to radiate a first signal generated by the transmitter;
   a second antenna element coupled to the receiver, the second antenna element being configured to receive signals; and
   at least one third antenna element coupled to at least one first reactive load, the at least one third antenna element being configured to radiate a second signal modified in accordance with the at least one first reactive load, the second signal being induced at the at least one third antenna element by the first signal, the at least one first reactive load comprising at least one of an inductive load, a capacitive load, or a combination of inductive and capacitive loads, and the at least one first reactive load being configured to modify the second signal by a reactance value of the at least one first reactive load to destructively cancel a third signal induced at the second antenna element by the first signal.

2. The communication device of claim 1, further comprising:
   at least one fourth antenna element coupled to at least one second reactive load, the at least one fourth antenna element being configured to radiate a fourth signal modified in accordance with the at least one second reactive load, the fourth signal being induced at the at least one fourth antenna element by the first signal, the at least one second reactive load being configured to modify the fourth signal to destructively cancel the third signal induced at the second antenna element by the first signal.

3. The communication device of claim 2, the at least one second reactive load comprising at least one of a second inductive load, a second capacitive load, or a second combination of inductive and capacitive loads.

4. The communication device of claim 2, the at least one fourth antenna element comprising three fourth antenna elements, the at least one second reactive load comprising three second reactive loads, each of the three fourth antenna elements being coupled to one of the three second reactive loads, and the second antenna element and the three fourth antenna elements forming a receiver cell.

5. The communication device of claim 1, the second antenna element being positioned at a null of a radio frequency (RF) current produced by the first antenna element.

6. The communication device of claim 1, each of the first antenna element, the second antenna element, and the at least one third antenna element being polarized and center fed.

7. The communication device of claim 1, a total number of antenna elements of the antenna being scalable in accordance with an operating frequency of the antenna.

8. The communication device of claim 1, wherein each of the at least one first reactive load terminates a respective one of the at least one third antenna element, wherein a single antenna array in the antenna includes the first antenna element and the second antenna element, and wherein the third signal is destructively cancelled through modification of RF currents induced at the second antenna element.

9. A communication device, comprising:
   a transmitter;
   a receiver; and
   an antenna, the antenna including:
   a first antenna element;
   a second antenna element;
   a splitter having an input, a first output, and a second output, the input being coupled to the transmitter, the first output being coupled to the first antenna element, the second output being coupled to the second antenna element, the splitter being configured to adjust at least one of a gain and phase imbalance between the first antenna element and the second antenna element, the first antenna element being configured to radiate a first adjusted version of a first signal generated by the transmitter, and the second antenna element being configured to radiate a second adjusted version of the first signal generated by the transmitter;
   at least one third antenna element coupled to at least one first reactive load, the at least one third antenna element being configured to radiate a second signal modified in accordance with the at least one first reactive load, the second signal being induced at the at least one third antenna element by the first adjusted version of the first signal and the second adjusted version of the first signal, and the at least one first reactive load being configured to modify the second signal to destructively cancel a third signal induced at a fourth antenna element by the first adjusted version of the first signal and the second adjusted version of the first signal; and
   the fourth antenna element operatively coupled to the receiver and being configured to receive signals.

10. The communication device of claim 9, further comprising at least one fifth antenna element coupled to at least one second reactive load, the at least one fifth antenna element being configured to radiate a fourth signal modified in accordance with the at least one second reactive load, the fourth signal being induced at the at least one fifth antenna element by the first adjusted version of the first signal and the second adjusted version of the first signal, and the at least one second reactive load being configured to modify the fourth signal to destructively cancel the third signal induced at the second antenna element by the first adjusted version of the first signal and the second adjusted version of the first signal.

11. The communication device of claim 9, the at least one first reactive load comprising at least one of an inductive load, a capacitive load, or a combination of inductive and capacitive loads.

12. The communication device of claim 10, the at least one second reactive load comprising at least one of an inductive load, a capacitive load, or a combination of inductive and capacitive loads.

13. The communication device of claim 9, the at least one third antenna element comprising two third antenna elements, the at least one first reactive load comprising two first reactive loads, each of the two third antenna elements being coupled to one of the two first reactive loads, and the first antenna element, the second antenna element, and the two third antenna elements forming a transmitter cell.

14. The communication device of claim 13, the two first reactive loads having different reactances.

15. The communication device of claim 10, the at least one fifth antenna element comprising three fifth antenna elements, the at least one second reactive load comprising three second reactive loads, each of the three fifth antenna elements being coupled to one of the three second reactive loads, and the fourth antenna element and the three fifth antenna elements forming a receiver cell.

16. The communication device of claim 15, the three second reactive loads having different reactances.

17. The communication device of claim 9, the fourth antenna element being positioned at a null of a radio frequency (RF) current produced by the first antenna element.

18. The communication device of claim 9, each of the first antenna element, the second antenna element, and the at least one third antenna element being polarized and center fed.

19. The communication device of claim 9, a total number of antenna elements being scalable in accordance with an operating frequency of the antenna.

20. An antenna, comprising:
a first antenna element configured to radiate a first signal;
a second antenna element configured to receive signals; and
at least one third antenna element coupled to at least one first reactive load, the at least one third antenna element being configured to radiate a second signal modified in accordance with the at least one first reactive load, the second signal being induced at the at least one third antenna element by the first signal, the at least one first reactive load comprising at least one of an inductive load, a capacitive load, or a combination of inductive and capacitive loads, and the at least one first reactive load being configured to modify the second signal by a reactance value of the at least one first reactive load to destructively cancel a third signal induced at the second antenna element by the first signal.

21. The antenna of claim 20, further comprising:
at least one fourth antenna element coupled to at least one second reactive load, the at least one fourth antenna element being configured to radiate a fourth signal modified in accordance with the at least one second reactive load, the fourth signal being induced at the at least one fourth antenna element by the first signal, the at least one second reactive load being configured to modify the fourth signal to destructively cancel the third signal induced at the second antenna element by the first signal.

22. The antenna of claim 21, the at least one second reactive load comprising at least one of a second inductive load, a second capacitive load, or a second combination of inductive and capacitive loads.

* * * * *